United States Patent [19]
Ishiwata et al.

[11] Patent Number: 5,877,857
[45] Date of Patent: Mar. 2, 1999

[54] ECCENTRICITY TESTER FOR HEAD TURNOUT ZONE OF MAGNETIC DISK AND TESTING METHOD THEREOF

[75] Inventors: Osamu Ishiwata, Odawara; Takayuki Ishiguro, Kanagawa-ken; Keiji Katoh, Minami-ashigara, all of Japan

[73] Assignee: Hitachi Electronics Engineering Co., Ltd., Tokyo, Japan

[21] Appl. No.: 926,011

[22] Filed: Sep. 9, 1997

[30] Foreign Application Priority Data

Sep. 10, 1996 [JP] Japan .................................. 8-261295

[51] Int. Cl.⁶ ...................................................... G01B 9/02
[52] U.S. Cl. ............................................ 356/357; 356/345
[58] Field of Search ...................................... 356/357, 345

*Primary Examiner*—Robert Kim
*Assistant Examiner*—Andrew H. Lee
*Attorney, Agent, or Firm*—Fay, Sharpe, Beall, Fagan, Minnich & McKee

[57] ABSTRACT

The tester and the test method for testing an eccentricity of a head turnout zone of a magnetic disk determine a turnout zone as acceptable or unacceptable by spirally scanning a turnout zone of a magnetic disk with a laser spot by rotating the magnetic disk and continuously moving either the laser spot radially of the magnetic disk or the magnetic disk radially thereof, obtaining a detection signal having amplitude corresponding to an intensity of a scattering light from the magnetic disk irradiated with the laser spot, extracting a first waveform of the detection signal corresponding to an intermediate region between an inside variation region in which an inside boarder line of the turnout zone radially of the magnetic disk by radial movement of the turnout zone caused by an ecentricity of the turnout zone and an outside variation region in which an outside boarder line of the turnout zone radially of the magnetic disk by the radial movement of the turnout zone caused by the eccentricity of the magnetic disk and a second waveform of either the detection signal adjacent to the first waveform and corresponding to the inside variation region or the detection signal adjacent to the first waveform and corresponding to the outside variation region and detecting an eccentricity of the turnout zone on a basis of a positional relation between the first and second waveforms.

10 Claims, 6 Drawing Sheets

ECCENTRICITY TESTER FOR HEAD TURNOUT ZONE OF MAGNETIC DISK AND TESTING METHOD THEREOF

TECHNICAL FIELD

A hard magnetic disk (referred to as "disk", hereinafter) is provided in a hard disk drive (HDD) and a write/read operation of data is performed thereto by a magnetic head (referred to as "head", hereinafter). In a recent HDD, in order to avoid the so-called head crash, etc., when the head is in an idle state in which it does not perform an access operation such as a write/read operation or a seek operation, the head shunts in a turnout zone provided as one of tracks around a center portion of the disk. FIGS. 6($a$) and 6($b$) illustrate the head turnout zone.

In FIG. 6($a$), a disk 1 is formed with a center hole 1$a$ having radius $R_i$ and the head turnout zone $T_x$ having a predetermined width W is provided inside a circle having radius $R_x$. A plurality of tracks $T_R$ for data write/read are provided in an annular area defined between the outermost circle of a recording region having radius $R_o$ and the outermost circle of the turnout zone $T_x$ having radius $R_x$.

A plurality of annular hole rows each including a number of holes h are formed in the turnout zone $T_x$ as shown in FIG. 6($b$). When the width W of the head turnout zone is, for example, 1 mm to several millimeters, a distance D between adjacent hole rows is about 20 $\mu$m and a diameter d of the hole h is about 6 $\mu$m. These holes are formed by melting corresponding portions of a surface of the disk by means of a laser beam. The arrangement of the holes h is usually referred to as a zone texture. Although the holes h are arranged coaxially in FIG. 6($a$), they may be formed along a spiral line.

It has been known that, in a conventional disk, holes or recesses are provided in data tracks as a texture in order to stably float a head with respect to the disk. However, in a high density recording disk, it is preferable to avoid the provision of texture in a portion of memory tracks thereof in view of increase of memory capacity thereof. Therefore, it has been usual to form a region in which a head is to stably float as a track in a center portion of the disk, which track is the above mentioned turnout zone (zone texture) $T_x$.

The turnout zone $T_x$ is formed on the disk by a device for intermittently irradiating the disk with a laser beam in a step separate from other fabrication steps of the disk. Therefore, when the turnout zone $T_x$ of the disk is formed, it may become eccentric with respect to a center of the disk. FIG. 7 illustrates an eccentricity of the turnout zone with respect to the center of the disk. In FIG. 7, when the turnout zone $T_x$ is eccentric with respect to the center O of the disk 1, a center of the turnout zone $T_x$ is shifted to O'. An amount of this shift is indicated by $\Delta R$ which is referred to as an amount of eccentricity of the head turnout zone. When the eccentricity amount $\Delta R$ is very small compared with a width W of the turnout zone $T_x$, that is, for example, when the amount $\Delta R$ is 300 $\mu$m or smaller which is one third smaller of the width W which is, for example, 1 mm to several millimeters, there is no trouble in an access of the head to data on a data track. However, when the amount $\Delta R$ exceeds such amount, there may be a risk that the head starts to access a track while the floating condition of the head is not stable as yet.

In order to solve this problem, It has been usual in the conventional technique that the width of the turnout zone $T_x$ is made large without measuring the amount of eccentricity of the head turnout zone. However, the increase of the width W of f the turnout zone $T_x$ is limited practically with a further increase of the memory density of the disk. Therefore, it becomes necessary to detect the eccentricity of the head turnout zone in order to certify the disk.

SUMMARY OF THE INVENTION

An object of the present invention is to provide an eccentricity tester for testing an eccentricity of a head turnout zone of a magnetic disk, which is capable of efficiently detecting an eccentricity of head turnout zone of the magnetic disk.

Another object of the present invention is to provide a method of testing an eccentricity of a head turnout zone of a magnetic disk to certify the magnetic disk.

An eccentricity tester for testing an eccentricity of a head turnout zone of a magnetic disk, according to the present invention, is featured by comprising a spindle for rotating a magnetic disk mounted thereon, a moving mechanism for continuously shifting either a laser spot radially of the magnetic disk or the magneric disk radially thereof, a light receiver responsive to a scattering light from the magnetic disk irradiated with the laser spot for generating a detection signal corresponding to an intensity of the scattering light, a spiral scanner for spirally scanning the head turnout zone with the laser spot by driving the spindle and the moving mechanism at a scanning speed at which one of an inner varying region in which an inner boarder line of the turnout zone varies radially of the magnetic disk by radial movement of the turnout zone caused by an eccentricity of the turnout zone and an outer varying region in which an outer boarder line of the turnout zone varies radially of the magnetic disk by the radial movement of the turnout zone caused by the eccentricity of the magnetic disk and an intermediate region between the inner and outer varying regions are sequentially scanned, and a detector circuit for detecting an eccentricity of the turnout zone on a basis of a positional relation between a first waveform of the detection signal output from the light receiver correspondingly to the intermediat region and a second waveform of either the detection signal adjacent to the first waveform and corresponding to the inner varying region or the detection signal adjacent to the first waveform and corresponding to the outer varying region under the spiral scan.

A method for testing an eccentricity of a head turnout zone of a magnetic disk according to the present invention is featured by comprising the steps of spirally scanning a turnout zone of a magnetic disk with a laser spot by rotating the magnetic disk and continuously moving either the laser spot radially of the magnetic disk or the magnetic disk radially thereof, obtaining a detection signal having amplitude corresponding to an intensity of a scattering light from the magnetic disk irradiated with the laser spot, extracting a first waveform of the detection signal corresponding to an intermediate region between an inner varying region in which an inner boarder line of the turnout zone varies radially of the magnetic disk by radial movement of the turnout zone caused by an eccentricity of the turnout zone and an outer varying region in which an outer boarder line of the turnout zone varies radially of the magnetic disk by the radial movement of the turnout zone caused by the eccentricity of the magnetic disk and a second waveform of either the detection signal adjacent to the first waveform and corresponding to the inner varying region or the detection signal adjacent to the first waveform and corresponding to the outer varying region, detecting an eccentricity of the turnout zone on a basis of a positional relation between the first and second waveforms and determining a degree of eccentricity of the turnout zone.

In the present invention, the turnout zone is divided to three regions according to a relation between a radial shift of the turnout zone due to the eccentricity of the turnout zone and the laser spot which moves radially to spirally scan the magnetic disk.

These three regions are the inner varying region in which the inner boarder of the turnout zone varies radially of the magnetic disk, the outer varying region in which the outer boarder of the turnout zone varies radially of the magnetic disk and the intermediate region between the inner and outer varying regions. The intermediate region is a region which is always in the turnout zone in the radial direction regardless of eccentricity of the turnout zone.

When the laser spot moving radial direction is in the inner varying region of the turnout region or the outer varying region of the turnout region, the level of the detection signal obtained from the light receiver becomes large at a short period. However, since these regions move radially of the disk, the detection signal has a waveform having a large amplitude when the laser spot is in these regions. Therefore, it is possible to detect that the laser spot is scanning these regions from the waveform of the detection signal from the light receiver. On the other hand, when the laser spot is in the intermediate region, a detection signal having substantially constant level is obtained for a long period. Therefore, the fact that the laser spot is scanning the intermediate region also can be detected from the waveform of the detection signal.

Since, as mentioned above, the waveform of the detection signal is different dependent upon the region scanned by the laser spot, it is possible to detect a time when the laser spot moves from the inner varying region of the turnout zone into the intermediate region or from the intermediate region into the outer varying region. The waveform of the detection signal obtained by the shift of the laser spot from the inner varying region of the turnout region into the intermediate region or from the intermediate region into the outer varying region varies correspondingly to the amount of eccentricity of the turnout zone.

When the amount of eccentricity is large, a distance (or time) between centers of waveform portions at a time when the laser spot enters into the intermediate region and at a time when it moves out from the intermediate region becomes small and, when the eccentricity is small, the distance becomes large. The reason for this is that the widths of the inner and outer varying ranges of the turnout zone are increased and the width of the intermediate region is reduced when the eccentricity of the zone is large. When the eccentricity is small, the widths of the varying regions are decreased and that of the intermediate region is increased. Details of this phenomenon will be described with reference to preferred embodiments of the present invention, later.

The degree of eccentricity of the turnout zone of the magnetic disk can be determined by comparing the waveform of the detection signal obtained by the shift of the laser spot from the inner varying region of the turnout region into the intermediate region or from the intermediate region into the outer varying region with reference values.

DESCRIPTION OF THE PREFERRED EMBODIMENTS

Figure 1:
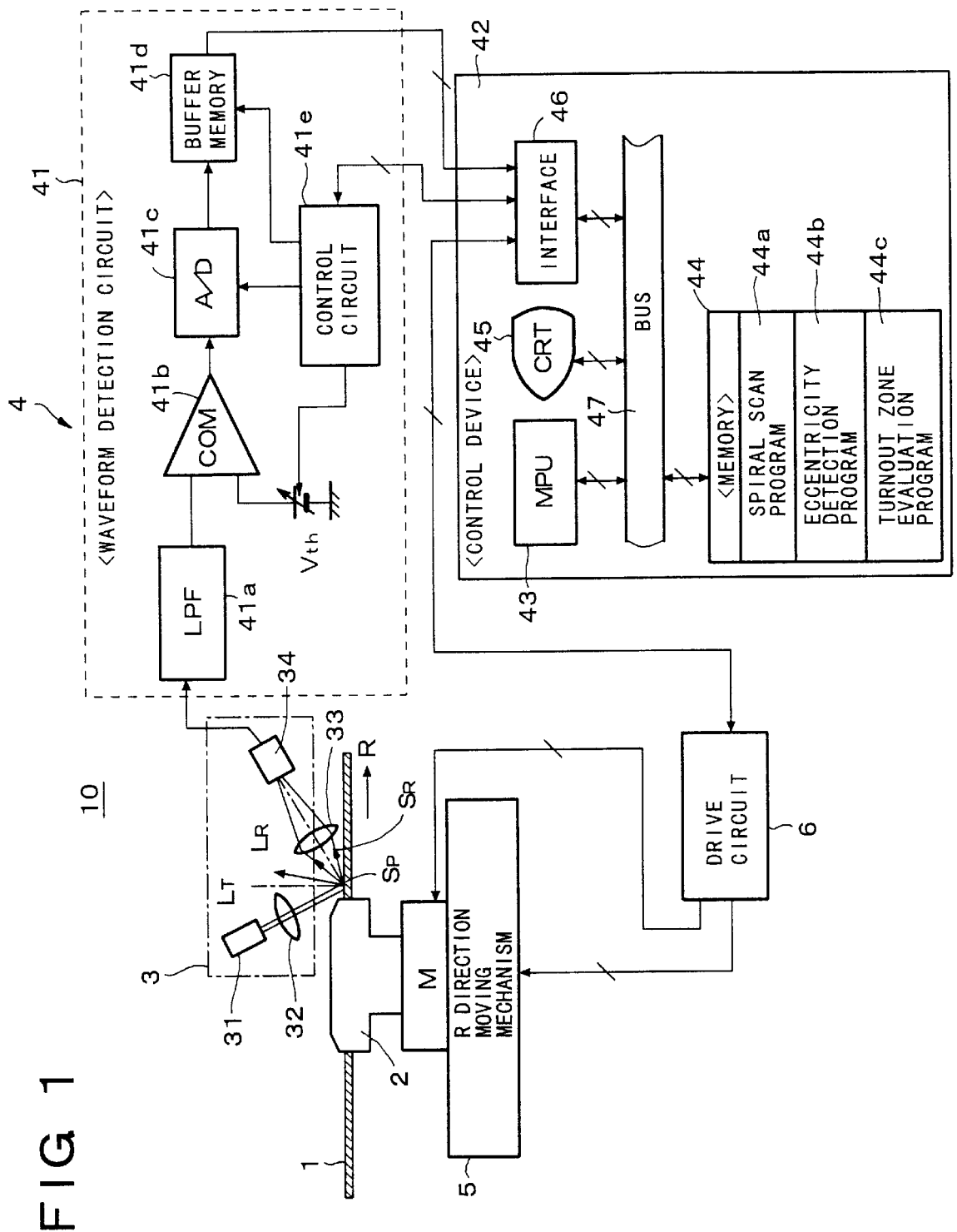
FIG. 1 shows a construction of a head turnout zone tester of a magnetic disk, according to an embodiment of the present invention.

In FIG. 1, a head turnout zone tester is depicted by a reference numeral 10. The head turnout zone tester 10 is constituted with a spindle 2, an optical test system 3 and an eccentricity tester 4.

A magnetic disk 1 to be tested is mounted on and rotated by the spindle 2 driven by a motor M. Incidentally, it is assumed that an eccentricity of the magnetic disk 1 itself to the spindle 2 when the disk is mounted thereon is negligible. The optical test system 3 is continuously moved radially outward of the magnetic disk 1. A laser beam $L_T$ output from a laser light source 31 of the optical test system 3 is focused onto a surface of the magnetic disk as a spot $S_P$ by a condenser lens 32. The movement of the optical test system 3 with respect to the magnetic disk 1 in a radial direction of the disk is realized by moving the disk 1 in the direction R by means of an R direction moving mechanism 5 for moving the spindle 2 in the direction R and the moving speed of the R direction moving mechanism 5 is controlled by a drive circuit 6. Therefore, the optical test system 3 is stationary. It is of course possible to move the optical test system 3 radially of the magnetic disk 1 which is stationary.

Since the magnetic disk 1 is rotating while moving in the direction R, the spot $S_P$ scans the surface of the magnetic disk 1 spirally. A turnout zone $T_x$ spotted by the spot $S_P$ produces scattering light $S_R$. This scattering light $S_R$ is collected by a condenser lens 33 provided along an optical axis out of a regular reflection light $L_R$ and received by a light receiver 34 constructed with such as avalanche phtodiode. An output of the light receiver 34 is supplied to a waveform detection circuit 41 of the eccentricity tester 4 as a detection signal.

The waveform detection circuit 41 includes a low-pass filter (LPF) 41a for removing noise component of the detection signal from the light receiver 34 and a comparing circuit 41b for deriving the detection signal having a level equal to or higher than a constant level by comparing the detection signal with a threshold value Vth. The waveform detection circuit 41 further includes an A/D converter 41c for converting the detection signal having level equal to or higher than the constant level into a digital value, a buffer memory 41d for storing the digital value as a detection data which is then read by the control device 42 of the eccentricity tester 4 and a control circuit 41e responsive to a control signal from the control device 42 for controlling the storing operation of the detection signal obtained by the spiral scan in the buffer memory 41d as the digital value. The buffer memory 41d may be provided in the control device 42.

The control device 42 controls the drive circuit 6 such that the spiral scan is performed by driving the spindle 2 by the motor to relatively move the optical test system 3 radially outward of the magnetic disk 1 by the R direction moving mechanism 5. In order to perform this processing, the control device 42 is provided with a micro processor unit (MPU) 43, a memory 44, a display 45 and an interface 46, etc., which are mutually connected through a bus 47. Further, the buffer memory 41d, the control circuit 41e and the drive circuit 6 are connected to the interface 46. The memory 44 stores a spiral scan program 44a, an eccentricity detection program 44b and a turnout zone evaluation program 44c, etc.

The R direction moving mechanism 5 moves the spindle 2 linearly at a predetermined speed in response to a drive current supplied from the drive circuit 6 to move the spot $S_P$ radially of the magnetic disk. In this case, the moving speed of the spindle 2 is determined correspondingly to the control signal supplied from the control device 42.

Figure 2:
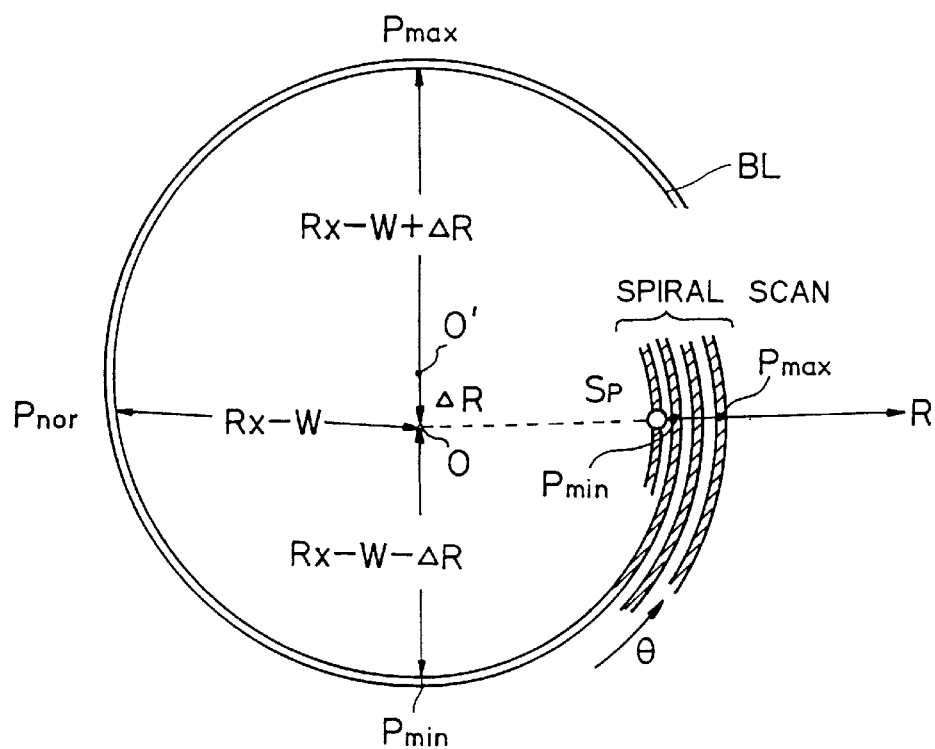
FIG. 2 illustrates a relation between a turnout zone and a laser spot.
Figure 5:
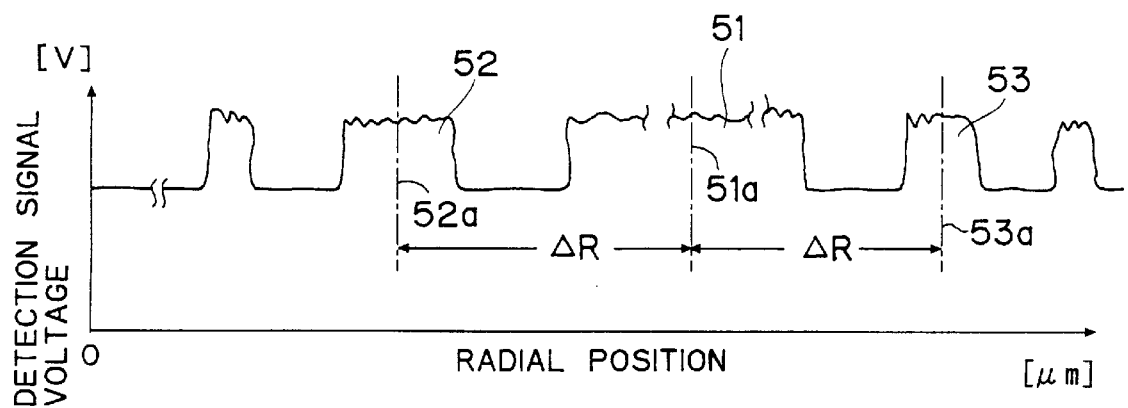
FIG. 5 shows a waveform of a detection signal.

The size and shape of the spot $S_P$ are determined correspondingly to the width W (=1000 μm to 3000 μm) of the turnout zone. In this example, the spot is an ellipse having a size of 50×120 μm with the major axis thereof being coincident with the radial direction of the magnetic disk. For simplicity of illustration, the spot $S_P$ is shown in FIG. 2 as having a circular shape. The control device 42 controls the various components such that the turnout zone is spirally scanned throughout its width W by moving the spot radially of the magnetic disk at, for example, about 50 μm/revolution. FIG. 5 shows a detection signal obtained in such manner and having a waveform corresponding to the amount of eccentricity of the head turnout zone.

FIG. 2 shows the relation between the turnout zone $T_x$ and the spot $S_P$. BL depicts an inner boarder line of the turnout zone $T_x$ and $R_x$−W+ΔR, $R_x$−W−ΔR and $R_x$−W are distances from a center O of the magnetic disk 1 and the inner boarder line of the turnout zone $T_x$ determined by the eccentricity of the turnout zone. $R_x$−W+ΔR is a radius measured up to the remotest point $P_{max}$, $R_x$−W−ΔR is a radius measured up to the nearest point $P_{man}$ and $R_x$−W is a radius measured up to a point $P_{nor}$ corresponding to a normal case where there is no eccentricity.

When the magnetic disk 1 is spirally by moving the spot $S_P$ in the direction R while rotating the disk 1 in a direction θ, the scan proceeds radially outward through the turnout zone $T_x$ as shown by hatched areas. With such spiral scan, the spot $S_P$ crosses the turnout zone $T_x$ from left to right. Thus, during one revolution of the magnetic disk 1, the spot $S_P$ passes the point $P_{max}$, the point $P_{nor}$ and the point $P_{min}$ of the turnout zone $T_x$ in the order. Therefore, the inner or outer boarder line of the turnout zone $T_x$ is moved to and fro in the moving direction of the spot $S_P$. This is because the turnout zone $T_x$ itself moves to and fro in the moving direction of the spot $S_P$ due to eccentricity thereof.

Therefore, the turnout zone $T_x$ is divided into a region in which the inner boarder is varied, a region in which the outer boarder line is varied and a region intermediate between these regions. In this description, the region in which the inner boarder line is varied is referred to as a inner varying region, the region in which the outer boarder line is varied is referred to as an outer varying region and the region intermediate between the inner and outer varying regions is referred to as an intermediate region. As described previously, waveform portions of the detection signal obtained before and after the laser spot enters from the inner varying region of the turnout zone into the intermediate region or before and after the laser spot enters from the intermediate region into the outer varying region varies correspondingly to the amount of eccentricity of the turnout zone such that a distance between centers of the waveform portions or a time period between the centers becomes small when the amount of eccentricity is large. This is because the widths of the inner and outer varying regions of the turnout zone are increased and so the width of the intermediate region in which the inner and outer varying regions overlap each other with the movement of the turnout zone is narrowed.

Figure 3:
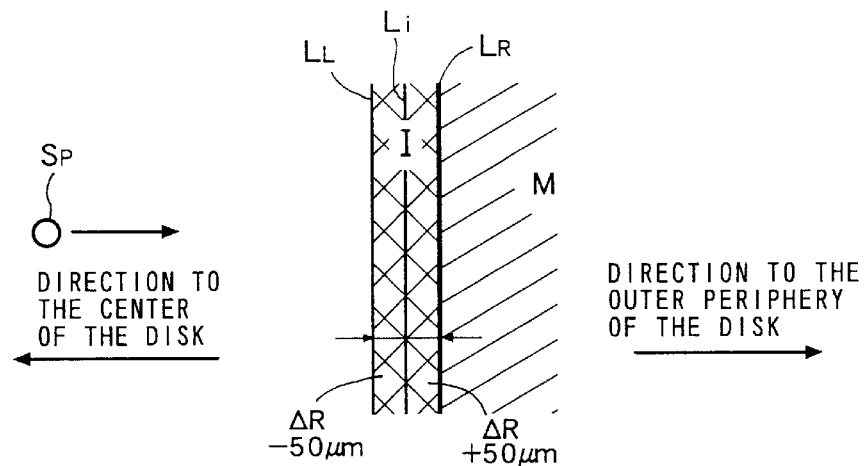
FIG. 3(a) illustrates a relation between the laser spot and a shift of an inner boarder line of the turnout zone.
FIG. 3(b) illustrates a relation between the laser spot and a shift of an inner boarder line of the turnout zone when an amount of eccentricity of the turnout zone is large.
FIG. 3(c) illustrates a relation between the laser spot and the inner and outer boarder lines of the turnout zone.
Figure 3:
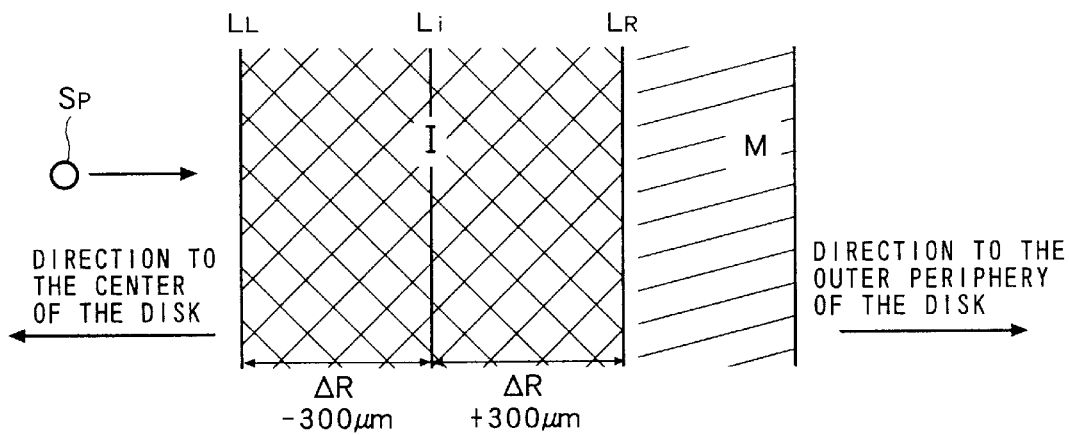
Figure 3:
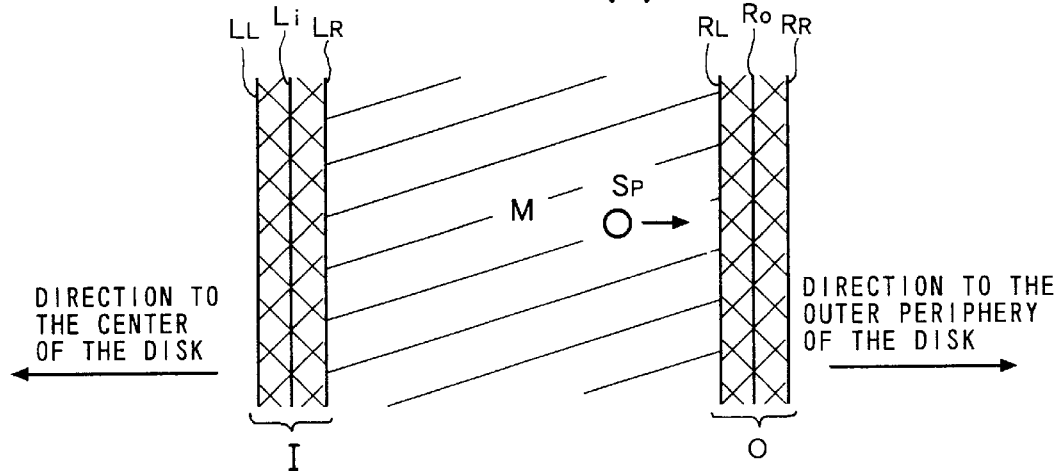

This phenomenon will be described with reference to FIGS. 3(a) to 3(c). In FIGS. 3(a) to 3(c), it is assumed that the amount ΔR of eccentricity is 50 μm. As shown in FIG. 3(a), the position of the inner boarder line (or its width W) of the turnout zone $T_x$ with respect to the moving spot $S_P$ is shifted by ±ΔR (=50 μm) in lateral directions for each revolution of the disk. Incidentally, the lefward direction is directed to the center of the magnetic disk and the rightward direction is directed to the outer periphery of the disk. For simplicity of the phenomenon, the size of the spot $S_P$ is not considered.

In FIG. 3(a), a line Li indicates the inner boarder line when the turnout zone is not eccentric and the lines $L_L$ and $L_R$ define the varying range of the inner boarder line when the turnout zone is eccentric. The varying range is the above mentioned inner varying region I and a region on the right side thereof is the intermediate region M.

Since, in this example, the spot $S_P$ moves at a speed of 50 μm/disk revolution, the inner boarder line of the eccentric turnout zone reciprocates laterally by ±50 μm with the line Li being a center every revolution of the disk. The line $L_L$ is in a position on the left side of the center of the disk by a distance of 50 μm from the line Li. The position of the line $L_L$ corresponds to the position of the inner boarder line moved from the nearest point $P_{min}$ in the moving direction of the spot $S_P$. The line $L_R$ is in a position on the right side of the center of the disk by a distance of 50 μm from the line Li. The position of the line $L_R$ corresponds to the position of the inner boarder line moved from the remotest point $P_{max}$ in the moving direction of the spot $S_P$.

The spirally scanning spot $S_P$ moves in a left to right direction towards the turnout zone $T_x$ along with the rotation of the disk 1. On the other hand, the boarder line moves from right to left and then returns from left back to right. A period of the boarder line moving between the line $L_L$ and the line $L_R$ corresponds to a time required for one revolution of the disk 1. With increase of the amount of eccentricity ΔR, distances of the line $L_L$ and the line $L_R$ from the line Li increase and the moving speed of the boarder line becomes higher.

Considering a timing of shift from the inner varying region I to the intermediate region (shift point), the shift point is slightly before the line $L_R$ since the moving speed of the spot $S_P$ is lower than the moving speed of the boarder line. Before this position, the spot $S_P$ goes in and out the turnout zone $T_x$ due to the reciprocal movement of the boarder line.

Assuming that the amount of eccentricity ΔR is increased to, for example, 300 μm as shown in FIG. 3(b), the distances of the lines $L_L$ and $L_R$ from the line Li are increased to ±300 μm. In this case, the moving speed of the boarder line is further increased. Further considering a position (timing) at which the spot $S_P$ passes through the line $L_R$ and enters into the turnout zone $T_x$ completely, the position is further shifted from that shown in FIG. 3(a) toward the center of the turnout zone. That is, the timing of the shift from the inner varying region I to the intermediate region M becomes closer to the center of the turnout zone $T_x$. In other words, the distance between the shift point from the inner varying region I to the intermediate region M and the center of the turnout zone $T_x$ becomes shorter.

The line $L_R$ corresponds to the amount of eccentricity $\Delta R$. Therefore, the position (shift point) at which the spot $S_P$ passes through the line $L_R$ and enters into the turnout zone $T_x$ completely is a function of the amount of eccentricity $\Delta R$. A deviation of the shift point from the line $L_R$ is slightly different dependently on whether the spot $S_P$ enters completely in the turnout zone $T_x$ when the shift of the boarder line is directed from the line $L_R$ to $L_L$ (going) or the spot $S_P$ enters completely in the turnout zone $T_x$ when the shift of the boarder line is directed from the line $L_L$ to $L_R$ (returning).

The spot $S_P$ enters into the turnout zone $T_x$ during the going movement of the boarder line when the spot $S_P$ starts from a position 25 µm before the line $L_R$. That is, if the spot $S_P$ is in between the line $L_R$ and the position 25 µm before the line $L_R$, the spot $S_P$ enters into the turnout zone $T_x$ during the going movement of the boarder line and the spot $S_P$ moves up to the intermediate region M during one reciprocation of the boarder line and enters inside the line $L_R$. Therefore, there is no case where the spot $S_P$ becomes outside the inner boarder line. On the other hand, the spot $S_P$ does not reach the line $L_R$ (intermediate region M) during one reciprocation of the boarder line when the spot $S_P$ starts from a position 50 µm before the line $L_R$, and so the spot $S_P$ is within the inner varying region I. As a result, a region in which it is uncertain whether or not the spot $S_P$ enters into the turnout zone $T_x$ during the going movement of the boarder line corresponds to a range from the position 50 µm before the line $L_R$ to the position 25 µm before the line $L_R$.

On the other hand, the spot $S_P$ enters into the turnout zone $T_x$ during the returning movement of the boarder line when the spot $S_P$ is in a range from a position 25 µm before the line $L_R$ to a position immediately before the line $L_R$. When the spot $S_P$ is in a position 25 µm before the line $L_R$, the spot $S_P$ does not reach the intermediate region M during the returning movement of the boarder line. Therefore, a region in which it is uncertain whether or not the spot $S_P$ enters into the turnout zone $T_x$ during the returning movement of the boarder line corresponds to a range from the position 50 µm before the line $L_R$ to the position immediately before the line $L_R$. However, since, in the same range, the spot $S_P$ is moving at 50 µm/disc revolution, the same range in the returning movement corresponds to a range in the going movement from the position 50 µm before the line $L_R$ to the position 25 µm before the line $L_R$.

As a result, a detection error of the shift point becomes 25 µm. Assuming that the amount of eccentricity to be measured is 300 µm, the amount 25 µm is 1/10 of the amount of eccentricity or smaller and may be negligible. This error can be made smaller by reducing the moving speed of the spot $S_P$. However, since the test efficiency may be reduced when the moving speed of the spot is reduced too much, it is preferable to select the degree of reduction of the moving speed of the spot suitably by taking the relation between it and the test efficiency into consideration. In this embodiment, the moving speed of the spot $S_P$ is set to 50 µm/revolution.

The position of the line $L_R$ corresponds to the amount of eccentricity $\Delta R$ and the shift point corresponds to the position of the line $L_R$ with error of 25 µm. The amount of eccentricity $\Delta R$ or the degree of eccentricity of the turnout zone $T_x$ can be detected or measured by a time (or distance) of movement from the position (shift point) which is completely within the turnout zone positioned before the line $L_R$ to the center of the turnout zone. However, it is difficult to detect these positions directly. In view of this fact, the reciprocation period of the boarder line is employed. In the moving cycle of the boarder line immediately before the position (shift point) in which the spot $S_P$ completely enters into the turnout zone $T_x$, the detection signal obtained includes a waveform portion corresponding to the inner varying region I in which the spot $S_P$ exists. Thus, the waveform portion of the detection signal, which corresponds to the inner varying region I immediately before the shift point, is detected in lieu of the shift point.

The waveform portion of the detection signal is obtained at a position (timing) before the line $L_L$ by a distance corresponding to a sum of a time for which the spot $S_P$ moves from the position of the line $L_L$ to the shift point and a reciprocation time of the boarder line. However, the moving period of the boarder line is constant and determined by the rotation speed of the disk.

Therefore, the timing at which the boarder line arrives at the line $L_L$ in the moving cycle of the boarder line immediately before the shift point represents the timing (shift point) at which the boarder line completely enters into the turnout zone $T_x$, although there is an offset corresponding to the aforementioned time. In this embodiment, the control device 42 employs this timing as to be detected. That is, as a parameter of the amount of eccentricity $\Delta R$, a period $\Delta d$ for which, during the moving cycle of the boarder line to the position immediately before the position (shift point) at which the spot $S_P$ completely enters into the turnout zone $T_x$, the spot $S_P$ moves from the position at which the boarder line arrives at the line $L_L$ to the center of the turnout zone is detected. Alternatively, the period $\Delta d$ may be calculated as a distance (position) between two waveform portions of the detection signal.

The position at which the boarder line arrives at the line $L_L$ is in the center of a waveform portion of the detection signal correspondig to the inner varying region I, with the moving speed of the spot $S_P$ being neglected. When the amount of eccentricity $\Delta R$ is ±300 µm, the moving speed of the spot $S_P$ becomes 50:600 which is small enough compared with the moving speed of the boarder line.

The above is also applicable to a relation between lines $R_L$ and $R_R$ defining the moving range of the outer boarder line of the turnout zone $T_x$ and a position $R_o$ of the outer boarder line when there is no eccentricity of the turnout zone, which is shown in FIG. 3(c). These lines are symmetrical to the lines $L_L$ and $L_R$ about the center of the intermediate region M. In this case, however, the timing at which the spot $S_P$ completely enters into the turnout zone $T_x$ is changed to a timing at which the spot $S_P$ just escapes out from the turnout zone. Therefore, the relation between the line $R_L$ and the spot $S_P$ corresponds to the relation between the line $L_R$ and the spot $S_P$.

As a result, in the case shown in FIG. 3(c), the amount of eccentricity $\Delta R$ can be detected by a time (period) when the boarder line arrives first at the line $R_R$ at which the spot $S_P$ moves from the center of the turnout zone $T_x$ and just escapes out from the turnout zone.

Incidentally, in the same figure, the range defined by the lines $R_R$ and $R_L$ is the aforementioned outer varying region O. The intermediate region M is on the left side thereof. Further, the position of the boarder line when it arrives at the line $L_R$ in the initial moving cycle of the boarder line when the boarder line just escapes from the turnout zone $T_x$ corresponds to a center of a waveform portion of the detection signal corresponding to the outer varying region O for the reason mentioned previously.

Thus, the time (period) for which the spot $S_P$ moves from the position at which the boarder line arrives at the line $L_L$ in the moving cycle of the boarder line immediately before the timing at which the boarder line completely enters into the turnout zone $T_x$ to the position of the center of the turnout zone, the time (period) for which the spot $S_P$ just escapes from the turnout zone starting from the center of the turnout zone position at which the boarder line arrives at the line $R_R$ in the initial moving cycle (moving cycle at that escape time) and the time (period) from a time before, under the above two conditions, the spot $S_P$ moves from a position immediately before the spot enters into the turnout zone to a position at which the spot just escapes from the turnout zone represent the amount of eccentricity ΔR, respectively.

FIG. 5 shows, in analog form, a waveform of the detection signal obtained by the spiral scan of the spot $S_P$ moving before the line $L_L$ throughout the turnout zone $T_x$ and escaping therefrom and stored in the buffer memory 41d. In FIG. 5, a reference numeral 51 shows a waveform portion of the detection signal corresponding to the intermediate region M, obtained from a time when the spot $S_P$ enters completely into the turnout zone to a time when the spot is immediately before escaping from the turnout zone. A reference numeral 51a shows a center of the waveform portion 51. A reference numeral 52 shows a waveform portion of the detection signal obtained in a time immediately before the shift point in the inner varying region I. A reference numeral 52a shows a center of the waveform portion. The center 52a shows a timing at which the boarder line arrives at the line $L_L$. Further, a reference numeral 53 shows a waveform portion of the detection signal of the initial moving cycle of the boarder line when, in the outer varying region O, the spot becomes out of the turnout zone. This corresponds to the waveform portion 52 and a reference numeral 53a shows a center of the waveform portion 53. The center 53a shows a timing at which the boarder line arrives at the line $R_R$ in the initial moving cycle of the boarder line when the spot escapes from the turnout zone.

Therefore, a time measured from the center 52a to the center 53a corresponds to the amount of eccentricity ΔR. In this embodiment, the MPU 43 calculates the above time as the peruiod Δd. Similarly, a time measured from the center 51a to the center 53a corresponds to the amount of eccentricity ΔR. In this embodiment, the MPU 43 also calculates the above time as the period Δd. Further, the MPU 43 calculates an average of the two values of the period Δd and outputs the average time as the period Δd.

Figure 4:
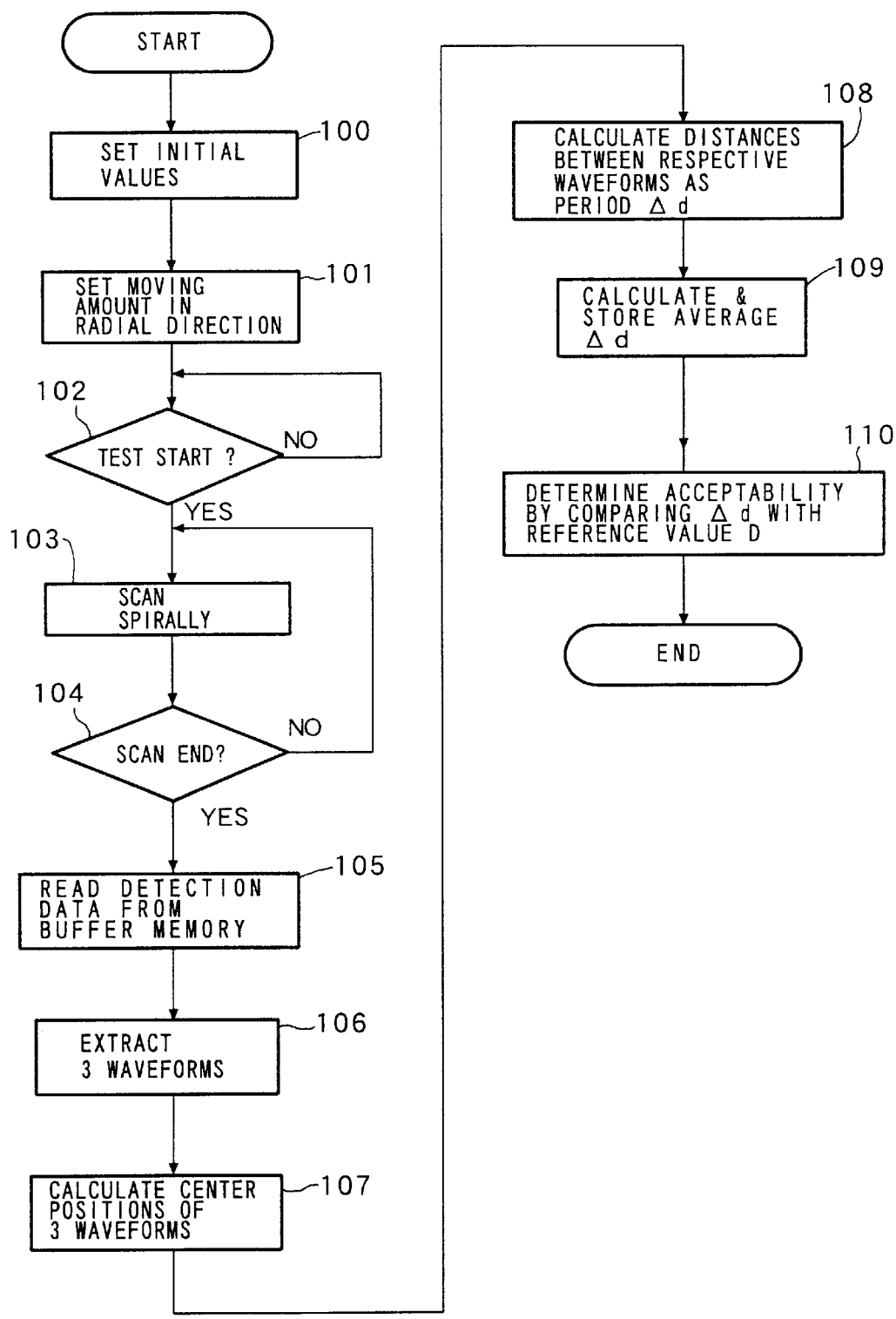
FIG. 4 is a flowchart of an eccentricity test processing.

Then, the calculation of the parameter Δd corresponding to the amount of eccentricity ΔR and the determination of the eccentricity of the turnout zone $T_x$, both of which are to be performed by the control device 42 will be described with reference to the flowchart shown in FIG. 4.

The MPU 43 calculates the period Δd corresponding to the amount of eccentricity by executing the eccentricity detection program 44b and determines the eccentricity of the turnout zone by executing the turnout zone determination program 44c.

The eccentricity detection program 44b is to extract the waveform of the detection signal shown in FIG. 5 from the detection signal obtained from the light receiver 34 and calculate the period Δd. The turnout zone determination program 44c is to determine the eccentricity by comparing the period Δd with a predetermined reference value D contained in the same program.

First, the disk 1 to be tested is mounted on the tester and initial values for the test are set in the control device 42 (Step 100). With the initial values set in the control device 42, the spindle 2 is moved to the optical test system 3 such that the laser spot $S_P$ is set in a portion of the disk which is inside the turnout zone and close to the center of the disk. Then, the MPU 43 executes first the spiral scan program 44a to set in the drive circuit 6 the amount of radial shift of the spot in order to spirally scan the disk at a speed of 50 μm/revolution (Step 101). Then, the MPU 43 enters into a waiting state waiting for a key input instructing a start of test (Step 102). Upon the key input for test start, the disk 1 is rotated to spirally scan the disk (Step 103) and it is determined whether or not the spiral scan is over (Step 104). The determination of the end of the spiral scan is performed on the basis of a scan time from the start of the spiral scan or the number of revolutions of the disk. Since the moving speed of the laser spot is 50 μm/revolution, the end of the spiral scan is determined when the number of revolutions of the disk becomes 60 when the width W of the turnout zone is 3 mm. Therefore, in this embodiment, the end of spiral scan is determined from the time or the number of revolutions by setting the number of revolutions to 100. When the scan is not completed, the processing is returned to the Step 103.

After the spiral scan is completed, the MPU 43 executes the eccentricity detection program 44b to read the detection data from the buffer memory 41d of the waveform detection circuit 41, transfer it to the memory 44 and store it therein (Step 105). Then,. the three waveform portions 51, 52 and 53 shown in FIG. 5 are extracted from the waveform of the detection signal (Step 106). The extraction of the waveform portions 51, 52 and 53 is performed by detecting the waveform portion 51 having the larsest width and then extractng adjacent to the waveform portion 51 on both sides thereof as the waveform portins 52 and 53.

Then, the centers 51a, 52a and 53a of the waveform portions 51, 52 and 53 are calculated by calculating widths of the respective waveform portions (Step 107). Then, the period (distances) Δd from the center 51a of the waveform portion 51 to the respective centers 52a and 53a of the waveform portions 52 and 53 are calculated (Step 108). Further, an average of the calculated periods Δd is calculated as Δd and stored in the memory 44 (Step 109).

Then, the MPU 43 executes the turnout zone determination program 44c to read the calculated period Δd from the memory 44, compare it with the reference value D and determine the quality as unacceptable when Δd≦D and acceptable when Δd>D (Step 110). Incidentally, the reference value D is an average of values of Δd measured a plurality of times for disks having the amount of eccentricity of 300 μm.

Figure 6A:
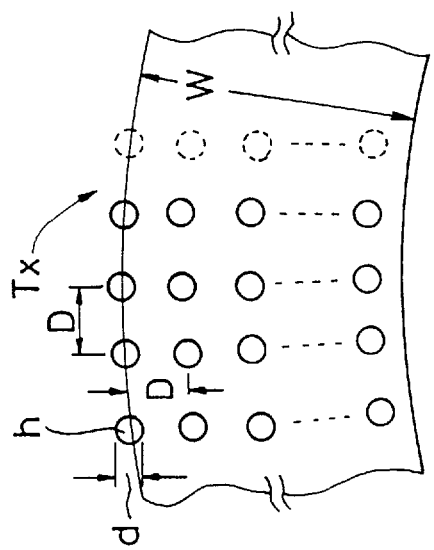
FIG. 6(a) is a plan view of a magnetic disk.
Figure 6B:
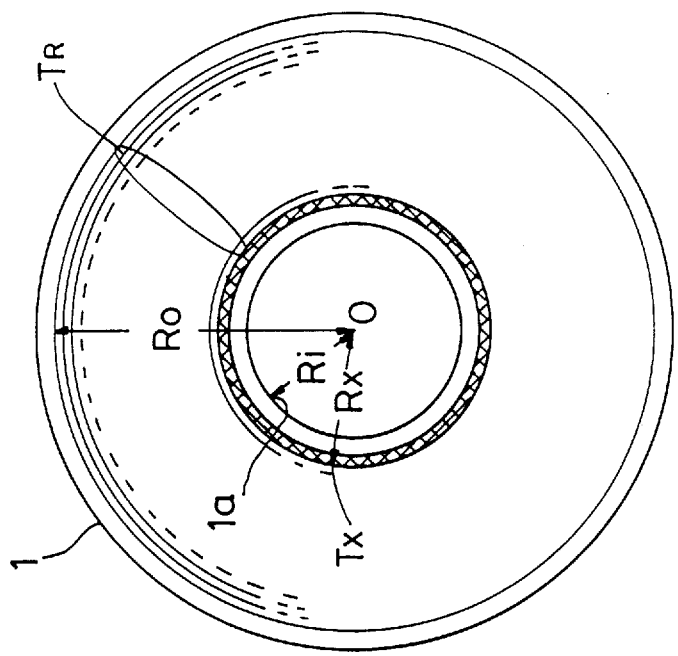
FIG. 6(b) shows the turnout zone in detail.
Figure 7:
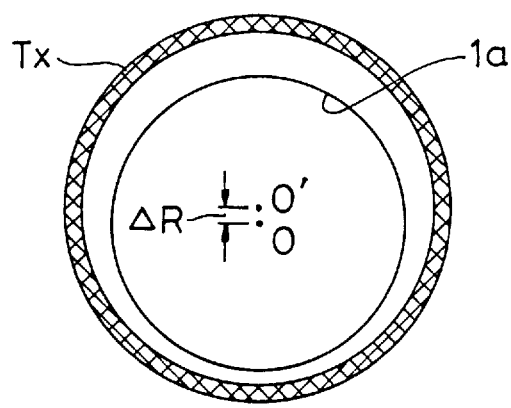
FIG. 7 illustrates eccentricity of the head turnout zone and an amount of eccentricity.

As described hereinbefore, the measurement of the amount of eccentriciy ΔR (period Δd) may be performed by moving the spot $S_P$ radially inward from the outer peripheral side of the disk at a speed different from 50 μm/revolution. Although, in the embodiment, the turnout zone is formed from a number of holes arranged coaxially as shown in FIG. 6(b), the detection method and the detection device according to the present invention can be applied to the turnout zone formed by arranging such holes spirally, provided that the pitch of the spirally arranged holes is small with respect to the amount of eccentricity to be detected, with the same effect as obtainable by the coxial arrangement of the holes.

What is claimed is:

1. A magnetic head turnout zone eccentricity tester for testing an eccentricity of a head turnout zone of a magnetic disk, provided in the vicinity of a center hole of the magnetic disk as a track having a predetermined radius, with respect to a center of the magnetic disk, comprising:

a spindle for rotating a magnetic disk mounted thereon;

a moving mechanism for continuously shifting either a laser spot radially of the magnetic disk or the magnetoic disk radially thereof;

a light receiver responsive to a scattering light from the magnetic disk irradiated with the laser spot for generating a detection signal corresponding to an intensity of the scattering light;

a spiral scan means for spirally scanning the head turnout zone with the laser spot by driving said spindle and said moving mechanism at a scanning speed at which one of an inner varying region in which an inner boarder line of the turnout zone varies radially of the magnetic disk by radial movement of the turnout zone caused by an eccentricity of the turnout zone and an outer varying region in which an outer boarder line of the turnout zone varies radially of the magnetic disk by the radial movement of the turnout zone caused by the eccentricity of the magnetic disk and an intermediate region between the inner and outer varying regions are sequentially scanned; and a detector means for detecting an eccentricity of the turnout zone on a basis of a positional relation between a first waveform portion of the detection signal output from said light receiver correspondingly to the intermediate region and a second waveform portion of either the detection signal adjacent to the first waveform portion and corresponding to the inner varying region or the detection signal adjacent to the first waveform portion and corresponding to the outer varying region under the spiral scan.

2. A magnetic head turnout zone eccentricity tester as claimed in claim 1, wherein the positional relation is either a time period between a center of the first waveform portion and a center of the second waveform porton or a distance between the first waveform portion and the second waveform portion and said detector means calculates either the time period or the distance.

3. A magnetic head turnout zone eccentricity tester as claimed in claim 2, wherein the spiral scan is performed by the laser spot crossing the turnout zone, the second waveform portion includes two waveform portions, one being adjacent to the first waveform portion and corresponding to the inner varying region and the other being adjacent to the first waveform portion and corresponding to the outer varying region, and the positional relation is an average value of a time period from a center of the waveform portion of the detection signal corresponding to the inner varying region to a center of the first waveform portion and a time period from a center of the detection signal correspinding to the outer varying region to the center of the first waveform.

4. A magnetic head turnout zone eccentricity tester as claimed in claim 3, further comprising a turnout zone determination means having a comparison reference value for the time period between the first and second waveform portions, wherein said turnout zone determination means compares the time period calculated by said detector means with the comparison reference value.

5. A magnetic head turnout zone eccentricity tester as claimed in claim 4, wherein said turnout zone determination means determines the magnetic disk as unacceptable when the time period is smaller than the comparison reference value.

6. A magnetic head turnout zone eccentricity tester as claimed in claim 5, further comprising a processor and a memory, wherein a portion of said spiral scan means, said detector means and said turnout zone determination means are realized by an execution of a program stored in said memory by means of said processor.

7. A magnetic head turnout zone eccentricity tester as claimed in claim 6, further comprising a comparing circuit, an A/D converter circuit and a buffer memory, wherein said comparing circuit compares the detection signal from said light receiver with a predetermined threshold value and supplies the detection signal having a value equal to or larger than a predetermined value to said A/D converter circuit, said A/D converter circuit converts the detection signal supplied from said comparing circuit into a digital value and stores it in said buffer memory and said processor obtains the digitized detection signal from said buffer memory.

8. A magnetic head turnout zone eccentricity test method for testing an eccentricity of a head turnout zone of a magnetic disk, provided in the vicinity of a center hole of the magnetic disk as a track having a predetermined radius, with respect to a center of the magnetic disk, comprising the steps of:

spirally scanning a turnout zone of a magnetic disk with a laser spot by rotating the magnetic disk and continuously moving either the laser spot radially of the magnetic disk or the magnetic disk radially thereof, obtaining a detection signal having amplitude corresponding to an intensity of a scattering light from the magnetic disk irradiated with the laser spot;

extracting a first waveform of the detection signal corresponding to an intermediate region between an inner varying region in which an inner boarder line of the turnout zone radially of the magnetic disk by radial movement of the turnout zone caused by an ecentricity of the turnout zone and an outer varying region in which an outer boarder line of the turnout zone radially of the magnetic disk by the radial movement of the turnout zone caused by the eccentricity of the magnetic disk and a second waveform of either the detection signal adjacent to the first waveform and corresponding to the inner varying region or the detection signal adjacent to the first waveform and corresponding to the outer varying region;

detecting an eccntricity of the turnout zone on a basis of a positional relation between the first and second waveforms; and determining a degree of eccentricity of the turnout zone.

9. A magnetic head turnout zone eccentricity test method as claimed in claim 8, wherein the positional relation is to calculate a time period between a center of the first waveform portion and a center of the second waveform portion.

10. A magnetic head turnout zone eccentricity test method as claimed in claim 9, wherein the spiral scan is performed by the laser spot crossing the turnout zone, the second waveform portion includes two waveform portions, one being adjacent to the first waveform portion and corresponding to the inner varying region and the other being adjacent to the first waveform portion and corresponding to the outer varying region, and the positional relation is an average value of a time period from a center of the waveform portion of the detection signal corresponding to the inner varying region to a center of the first waveform portion and a time period from a center of the detection signal correspinding to the outer varying region to the center of the first waveform.

* * * * *

UNITED STATES PATENT AND TRADEMARK OFFICE
CERTIFICATE OF CORRECTION

PATENT NO. : 5,877,857

DATED : March 2, 1999

INVENTOR(S) : Ishiwata et al.

It is certified that error appears in the above-identified patent and that said Letters Patent is hereby corrected as shown below:

Column 11, line 5, "magnetoic" should read --magnetic--.

Signed and Sealed this

Twentieth Day of April, 1999

Q. TODD DICKINSON

*Attest:*

*Attesting Officer*       Acting Commissioner of Patents and Trademarks